US012266987B1

(12) United States Patent
Burchfield (10) Patent No.: US 12,266,987 B1
(45) Date of Patent: Apr. 1, 2025

(54) ROTATING BRUSHES FOR ELECTRIC MOTORS

(71) Applicant: Larry A. Burchfield, West Richland, WA (US)

(72) Inventor: Larry A. Burchfield, West Richland, WA (US)

( * ) Notice: Subject to any disclaimer, the term of this patent is extended or adjusted under 35 U.S.C. 154(b) by 0 days.

(21) Appl. No.: 18/854,247

(22) PCT Filed: Apr. 19, 2023

(86) PCT No.: PCT/US2023/065936
§ 371 (c)(1),
(2) Date: Oct. 4, 2024

(87) PCT Pub. No.: WO2023/205679
PCT Pub. Date: Oct. 26, 2023

Related U.S. Application Data

(60) Provisional application No. 63/363,311, filed on Apr. 20, 2022.

(51) Int. Cl.
| | |
|---|---|
| *H02K 13/10* | (2006.01) |
| *H01R 39/04* | (2006.01) |
| *H02K 1/18* | (2006.01) |
| *H02K 7/08* | (2006.01) |
| *H02K 7/10* | (2006.01) |
| *H02K 13/00* | (2006.01) |

(52) U.S. Cl.
CPC ............ *H02K 13/006* (2013.01); *H02K 1/18* (2013.01); *H02K 7/08* (2013.01); *H02K 7/10* (2013.01); *H02K 13/10* (2013.01)

(58) Field of Classification Search
CPC .... H02K 13/006; H02K 13/10; H02K 13/105; H02K 5/14; H02K 1/18; H02K 7/08; H02K 7/10; H01R 39/04; H01R 39/045; H01R 39/028; H01R 39/38; H01R 39/39; H01R 39/40; H02M 3/40; H02M 1/24; H02M 1/22; H02M 5/36; H02M 7/34; H02M 7/60; H02M 7/92
USPC .......................................................... 310/239
See application file for complete search history.

(56) References Cited

U.S. PATENT DOCUMENTS

| | | | |
|---|---|---|---|
| 3,555,328 A | 1/1971 | Hunsdorf | |
| 2009/0152978 A1 | 6/2009 | Fournier et al. | |

FOREIGN PATENT DOCUMENTS

| | | | | |
|---|---|---|---|---|
| CN | 112038855 A | * | 12/2020 | ............ H01R 39/28 |
| DE | 102016224462 A1 | * | 6/2018 | ............ H01R 39/28 |
| JP | 61094537 A | | 5/1986 | |

(Continued)

OTHER PUBLICATIONS

Machine translation of CN-112038855-A. (Year: 2020).*

(Continued)

*Primary Examiner* — Michael Andrews
(74) *Attorney, Agent, or Firm* — Andrew F. Young, ESQ.; NOLTE LACKENBACH SIEGEL (57) ABSTRACT

A rotating brush assembly for an electric motor, including a commutator and a plurality of brushes, each of the brushes rotatingly mounted on an axle disposed between arms coupled to respective first and second brush holders, wherein the brush holders are urged toward said commutator with a spring, and wherein the brushes rotate in a direction opposite the direction in which the commutator rotates.

17 Claims, 9 Drawing Sheets

(56) References Cited

FOREIGN PATENT DOCUMENTS

JP           S6194537 A  *  5/1986  ............. H02K 13/00
KR     20150128248 A  * 11/2015  ............. H02K 13/10

OTHER PUBLICATIONS

Machine translation of DE-102016224462-A1. (Year: 2018).*
Machine translation of JP-S6194537-A. (Year: 1986).*
Machine translation of KR-20150128248-A. (Year: 2015).*
PCT/US23/65936 International Search Report and Written Opinion dated Sep. 27, 2023, 8 pages—English.

\* cited by examiner

ROTATING BRUSHES FOR ELECTRIC MOTORS

CROSS REFERENCE TO RELATED APPLICATIONS

This application relates to and claims priority as a §371 national phase, from PCT/US2023/065936 filed Apr. 19, 2023, the entire contents of which are incorporated herein by reference, which in turn claims priority from U.S. Prov. Pat. Appln. Ser. No. 63/363,311 filed Apr. 20, 2022.

FIGURE SELECTED FOR PUBLICATION

FIG. 1

BACKGROUND OF THE INVENTION

Technical Field

The present invention relates generally to electric motors, and more particularly to improved rotating brushes that reduce brush wear so as to maintain good electrical contact between the stationary components of an electrical motor power supply and the motor rotating shaft.

Background Art

Electric motors rely on electromagnetic induction, a phenomenon discovered in the early 1800s by physicist Michael Faraday, who observed that moving a magnet through a toroid wrapped in conductive wire generated an electric current in the wire. Electric motors exploit this phenomenon in reverse: When a current passes through a coil, the coil becomes magnetized, and if the coil is attached to a shaft and suspended in the field generated by a permanent magnet, the opposing magnetic forces create enough force to turn the shaft. Work can be done by connecting the shaft to a gear mechanism; adding bearings reduces friction and increases the efficiency of the motor.

The Stator, Rotor, Brushes and Commutator: Rather than using a permanent magnet, modern commercial electric motors usually rely completely on electromagnets. A series of small coils arranged in a circular arrangement forms the stator, and these coils generate a standing magnetic field. A separate coil wound around an armature and attached to a shaft forms the rotor, which spins inside the field. Because stationary wires cannot be connected to a spinning coil, in DC motors generally, universal motors, and wound-rotor synchronous motors, the rotor usually incorporates a commutator rigidly connected to the rotor shaft and having a conducting surface that remains in electrical contact with a conducting surface on the stator, namely brushes, though which a voltage is supplied. The brushes are a kind of sliding electrical contact with the conductive surfaces of a sectioned commutator. The brushes, along with the stator windings, are connected to power terminals located on the motor housing.

In motors employing field coils in the stator, when power to the motor is turned on, electricity flows into the field coils to create a standing magnetic field. It also flows through the brushes and energizes the armature coil. Traditional brushed DC motors (dynamos and generators), such as those running on battery power, also include a commutator, which is a switch attached to the rotor shaft that reverses the electric field with every half spin of the rotor. This field reversal is necessary to keep the rotor spinning in one direction. The brushes contact the commutator through generally evenly spaced electrical contact points on the brush surfaces.

Friction between the commutator and brushes causes the conductive surfaces to wear during use, causing electrical and acoustical noise, reducing the service life of the brushes, and rendering brushed motors generally ill-suited for continuous use. Indeed, they often have a short useful life and require regular maintenance. Accordingly, brushes are typically fabricated from conductive materials slightly softer than the materials with which the commutator are made, because brushes are generally easier to repair and replace than commutators. Additionally, brushes are generally made from conductive carbon materials having a low and stable friction coefficient so as to prevent overheating during use.

Thus, the favored material for electric motor brushes is conductive carbon, provided in five different brush grades in brush manufacturing, with soft graphite brushes among the favored grades (others including electrographitic brushes, carbographitic brushes, resin-bonded brushes, and metal graphite brushes being other grades). The brush is formed in a block or bar form. The graphite block is urged into contact with the commutator/armature with a spring with sufficient pressure to maintain constant contact. The graphite block serves two purposes: (1) it is conductive and provides voltage to the armature; and (2) graphite is also a lubricant and thereby reduces wear and friction at the contact point of the brush with the armature.

The fundamental shortcoming in these types of brushes, as mentioned above, is that they suffer friction-induced wear over time, sometimes quickly, and may have a short service life requiring regular maintenance and replacement. Along with the commutator, they are regarded as consumable components, even when configured and fabricated with optimal materials having optimal mechanical characteristics. The block, cuboid, or flat shapes of brushes, even when fabricated from low friction materials, are structurally fixed in relation to the commutator, and thus they are still prone to rapid wear and distortion, and cause, in turn, wear on the commutator. Electrical contact between the power supply and the rotating components of the motor is thereby compromised and performance degrades correspondingly.

DISCLOSURE OF INVENTION

In embodiments, the present invention is a rotatable, cylinder-shaped brush for electric motors and generators. The inventive rotatable brush of the present invention is rotatingly mounted on a brush holder, and it is urged against a commutator by a spring on the back of the brush holder. In a motor assembly, pairs of cylindrically shaped brushes mounted in opposing pairs on each side of a commutator include gears or gaskets that cooperate and engage with complementary gears or gaskets on the commutator to cause rotation in opposing directions and to match the rotation or spin rates of the brushes and prevent slippage between the brushes and the commutator. Viewed on end from either side, and in either one-directional or reversible motors, CCW rotation of the commutator causes CW rotation of the brushes, and vice versa. This converts the brushes from sliding contacts to rotating contacts and thereby effectively eliminates brush wear between the partnered surfaces due to abrasive friction. This also facilitates use of brush grades with harder brush materials and higher coefficients of friction, dramatically reducing motor heat, increasing the durability of the brushes, reducing brush debris in the motor, reducing commutator scratching and film buildup, and thereby improving electrical contact and substantially reducing the need for brush cleaning and replacement. This also opens up countless possibilities for selecting currently disfavored brush materials that are problematic only due to friction but would otherwise provide superior electrical contact and reduced current loss.

In other embodiments, the brushes play a dual role, acting both as brushes and as commutator bearings, thereby increasing service life of the brushes while simplifying the commutator/brush assembly and reducing mechanical parts.

In still other embodiments, the rotating brushes are gears that rotate in mesh with a geared commutator.

BEST MODE FOR CARRYING OUT THE INVENTION

Figure 1:
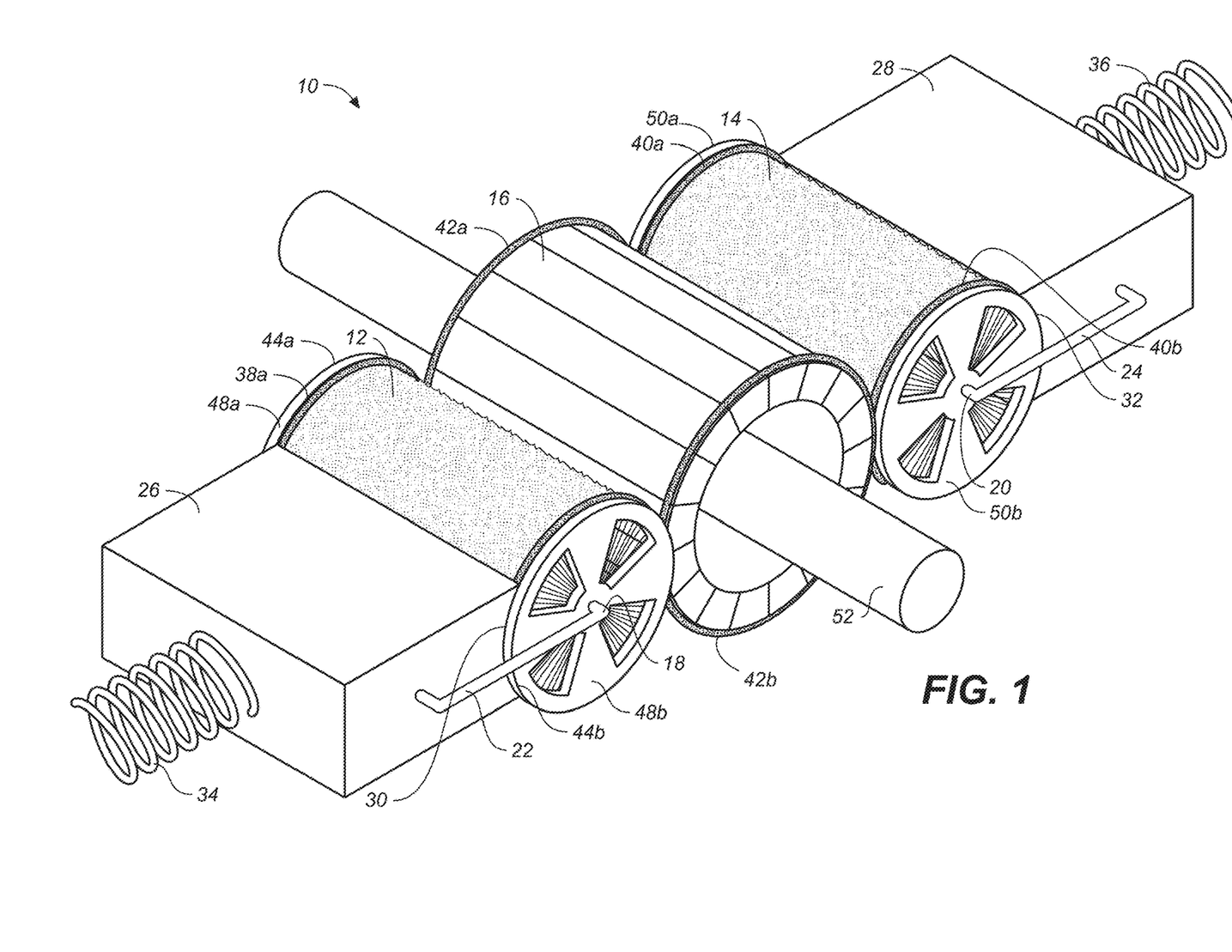
FIG. 1 is highly schematic upper perspective view of an embodiment of the rotating brushes of the present invention, mounted on brush holders and urged against a segmented commutator.
Figure 2:
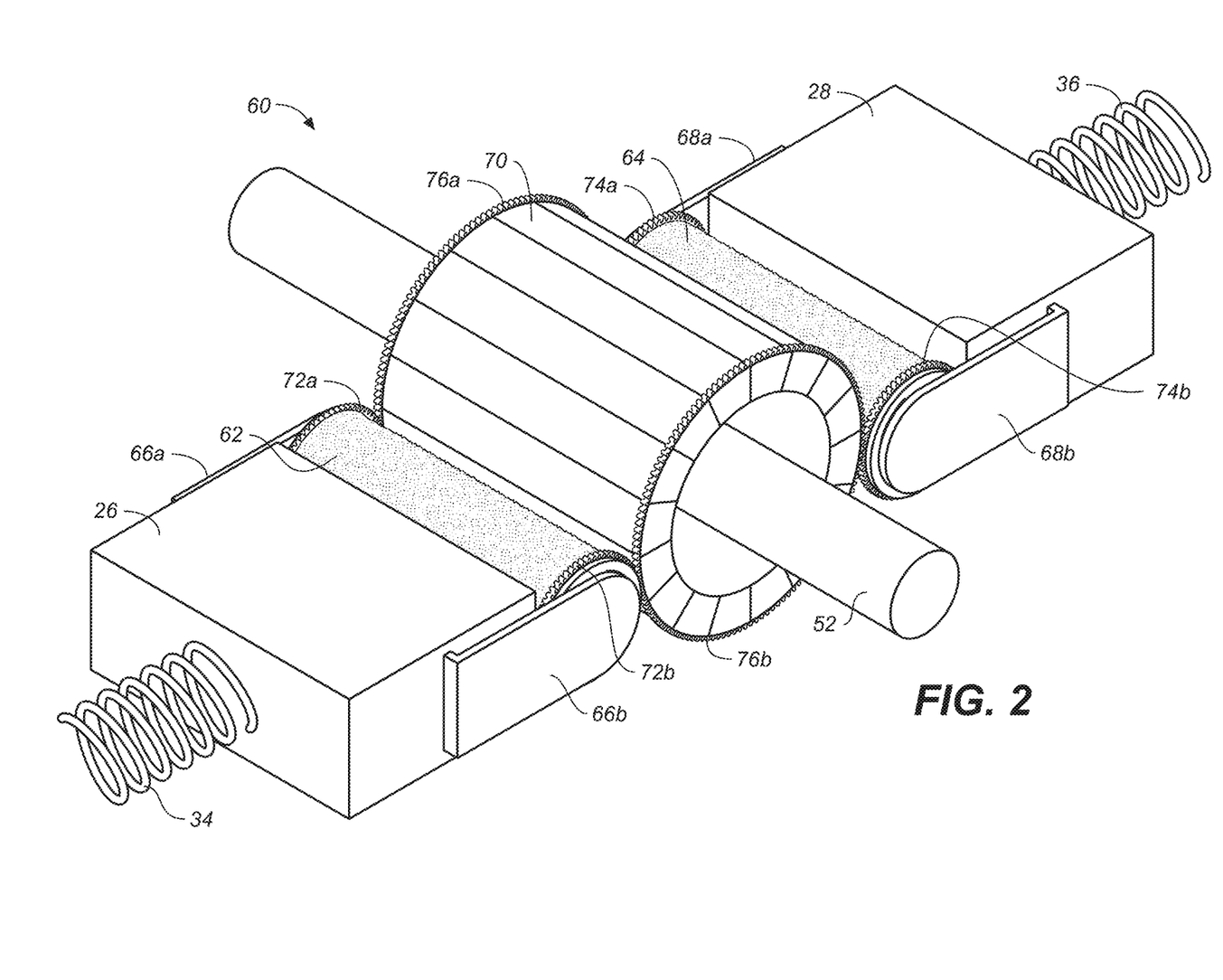
FIG. 2 is the same view showing an alternative embodiment of the present invention.

Referring to FIGS. 1 and 2, wherein like reference numerals refer to like components in the various views, there is illustrated therein a new and improved rotating brush and brush assembly for use in electric motors. FIG. 1 illustrates an embodiment 10 of paired rotating brushes 12, 14, disposed on and engaging opposing sides of a segmented commutator 16 having tapered bars or segments, preferably with a thin strip of insulating material (e.g., mica or micanite) between segments. (Power supply to the brushes is not shown but is well known in the art, and the polarity of the brushes is fixed.)

As can be seen, each brush is rotatingly disposed on an axle 18, 20, coupled through struts or arms 22, 24, to a brush holder 26, 28. The brush holders preferably include an arcuate concavity 30, 32, each having a radius generally conforming to the circumferential radius of their respective cylindrical brushes. The axle arms keep the brushes closely but entirely spaced apart from the brush holders. The brush holders themselves are preferably urged toward the commutator by an elastic body, e.g., springs 34, 36, affixed to the stator (not shown) and thereby bringing the brushes into physical engagement and electrical contact with the segmented commutator 16. However, the brush holders may also be secured to the stator with a stationary mount as well, inasmuch as the brushes include an annular surface element 38a, 38b, and 40a, 40b, respectively, on their cylindrical ends, which engage complementary annular surface elements 42a, 42b, disposed on each cylindrical end of the commutator.

In embodiments, the annular surface element on the brushes is a gasket or O-ring which may be captured between circumferential flanges 44a, 44b, 46a, 46b comprising the outermost portion of discs 48a, 48b, 50a, 50b, capping the ends of the brushes. The flanges secure the resilient member and prevent it from distorting or migrating outwardly on the brushes and further keep the brushes from moving laterally in relation to the commutator, and thereby perfectly centered even when springs are employed to drive the brush holders toward the commutator. Thus, it can be seen that suitable mechanical (rotational) coupling of the cylindrical brushes with the cylindrical segmented commutator may be accomplished using O-rings disposed in channels or using gaskets disposed around the circumferential surfaces of the respective structures disposed on the respective brush and commutator ends.

In either case, spacing between the commutator and brushes is effectively maintained by the mechanically engaged elements, and rotation of the armature axle or shaft 52 in either a clockwise or counterclockwise direction induces matched but opposing rotation in each of the two brushes, thus maintaining consistent electrical contact and reducing brush and commutator friction. Note that no effort is made here to illustrate other components in the electric motor; thus, the armature itself and the stator are implied, as both are well known. Rather, the focus of the present invention is exclusively on the commutator and brush assembly, and the novel components and features thereof.

While contemplated and entirely within the scope of the invention, in yet another embodiment the matched but opposing rotation of the commutator and brushes may be accomplished using only the surface engagement of the brushes and the commutator. In such an embodiment, a perfect rotational match may be impossible, but in lower cost motors, for all practical purposes it will achieve the mechanical advantages of the inventive rotational brushes.

In an alternative embodiment 60, shown in FIG. 2, the brushes 62, 64, may be secured on arms 66a, 66b, 68a, 68b, more rigid and robust than those illustrated in FIG. 1. Ideally, the arms keep the brushes centered in the brush holder, such that rotation in either direction does not appreciably move the brush off center in the arcuate concavity of the brush holder. Additionally, the mechanical (rotational) coupling of the commutator 70 and brushes 62, 64 may be accomplished using brush gear teeth 72a, 72b, 74a, 74b in mesh with gear teeth 76a, 76b on the commutator. Note should be made here that commutator bars or segments are not discretely shown, as the principle of segmenting the commutator to provide switching voltages to armature/rotor windings is well known. However, the segmented configuration is discussed more fully below with respect to the more exotic alternative embodiments directed to geared rotating brushes and complementary geared commutator.

Figure 3:
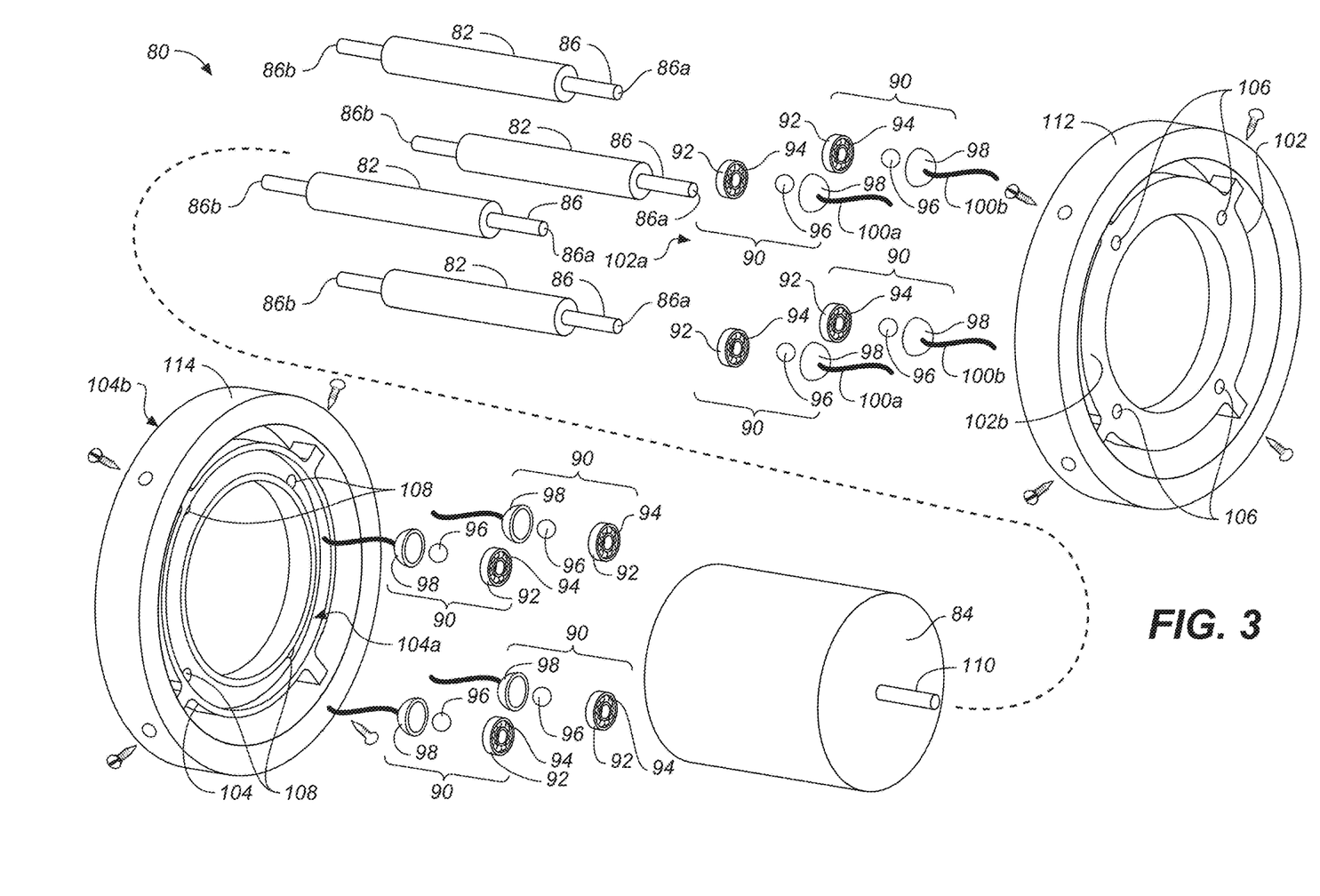
FIG. 3 is an exploded upper perspective view showing an embodiment of the present invention in which rotating brushes play a dual role, acting as cylindrical roller bearings for the commutator.
Figure 4:
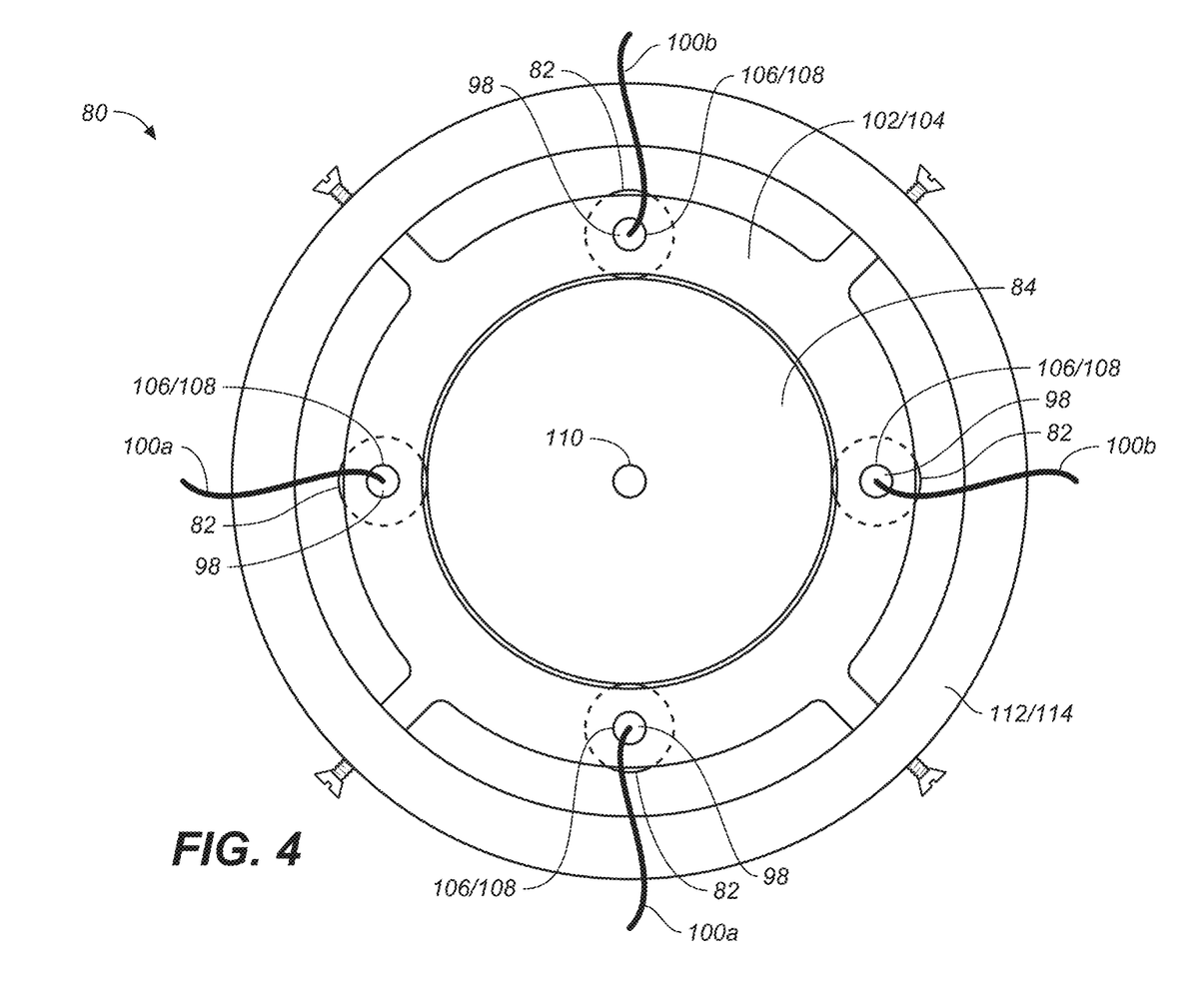
FIG. 4 is an end view in elevation thereof.

Preliminarily, however, and referring now to FIGS. 3-4, in another embodiment 80, the rotating brushes may be configured as electrically energized cylindrical roller bearings 82 which support and electrically couple with a segmented commutator 84. In this configuration, each cylindrical brush/bearing 82, includes a conductive shaft 86 rotatably journaled at their first and second ends 86a, 86b, in a cup holder assembly 90 that functions in the manner of, but as an alternative to, a slip ring. The bearing assembly includes a bearing race 92, ball bearings 94, a conductive coupling bearing 96, and a hemispherical cap 98, through which an electrical lead 100 is disposed at or near the apex of the hemispherical (or domed) cap. The lead 100 electrically contacts with coupling bearing 96, which in turn couples to an end 86a/86b of the conductive shaft 86 of the brush/cylindrical roller bearing 82.

Each assembled cup holder assembly 90 is disposed in first and second dielectric cup holder housings 102, 104, which each include a channel or space in an inner side 102a, 104a, into which the cup holder assemblies may be secured. Each spaced apart positive and negative 100a, 100b, lead feeds through an aperture 106, 108, through the outer sides 102b, 104b, of the first and second cup holder housings 102, 104.

In embodiments, the number of rotating brushes/roller bearings is selected according to the mechanical and operational requirements of the motor, though they are in opposing orientations, such that they provide opposing currents switched by the commutator in accordance with the number of poles in the motor and the optimal direction of force for constant torque. The rotating brushes/roller bearings 82 center and mechanically support the commutator 84 while thus provide a switching and rectifying circuit to energize the armature that maintains the constant torque on the armature, and thereby the motor shaft 110, and this is accomplished with dramatically reduced friction between the rotating brushes/cylindrical bearings and the commutator.

The cup holder housings 102, 104, may be secured in first and second housing supports or frames 112, 114, with fasteners 116. The housing supports 112, 114, may be integral with or connected to the motor housing.

In this embodiment, contact between the rotating brushes/roller bearings and the commutator is direct and constant with little to no friction from shear forces. However, the brushes are electrically isolated from one another and may be wired independently and provided with current according to the commutator switching scheme.

Looking now at FIGS. 5-8, there is shown yet another alternative embodiment of the present invention, 120, again incorporating low friction rotating brushes 122. However, in this embodiment, the rotating brushes are geared, i.e., have toothed surfaces, as is the commutator 124, and their rotation in relation to one another involves directionally opposite rotation of gear teeth in mesh. This mesh engagement significantly enhances the electrical contact between the brushes and the commutator, while still accomplishing the principal objective of the present invention—reduced wear and degraded performance due to shear friction.

In this embodiment, the rotating brushes 122 again have shafts 126 that may again be rotatably journaled at their first and second ends 128a, 128b, in bearing assemblies (not shown in this view, but see FIGS. 3-4) disposed in first and second cup holder housings 130, 132 secured in first and second housing supports 134, 136.

Figure 5:
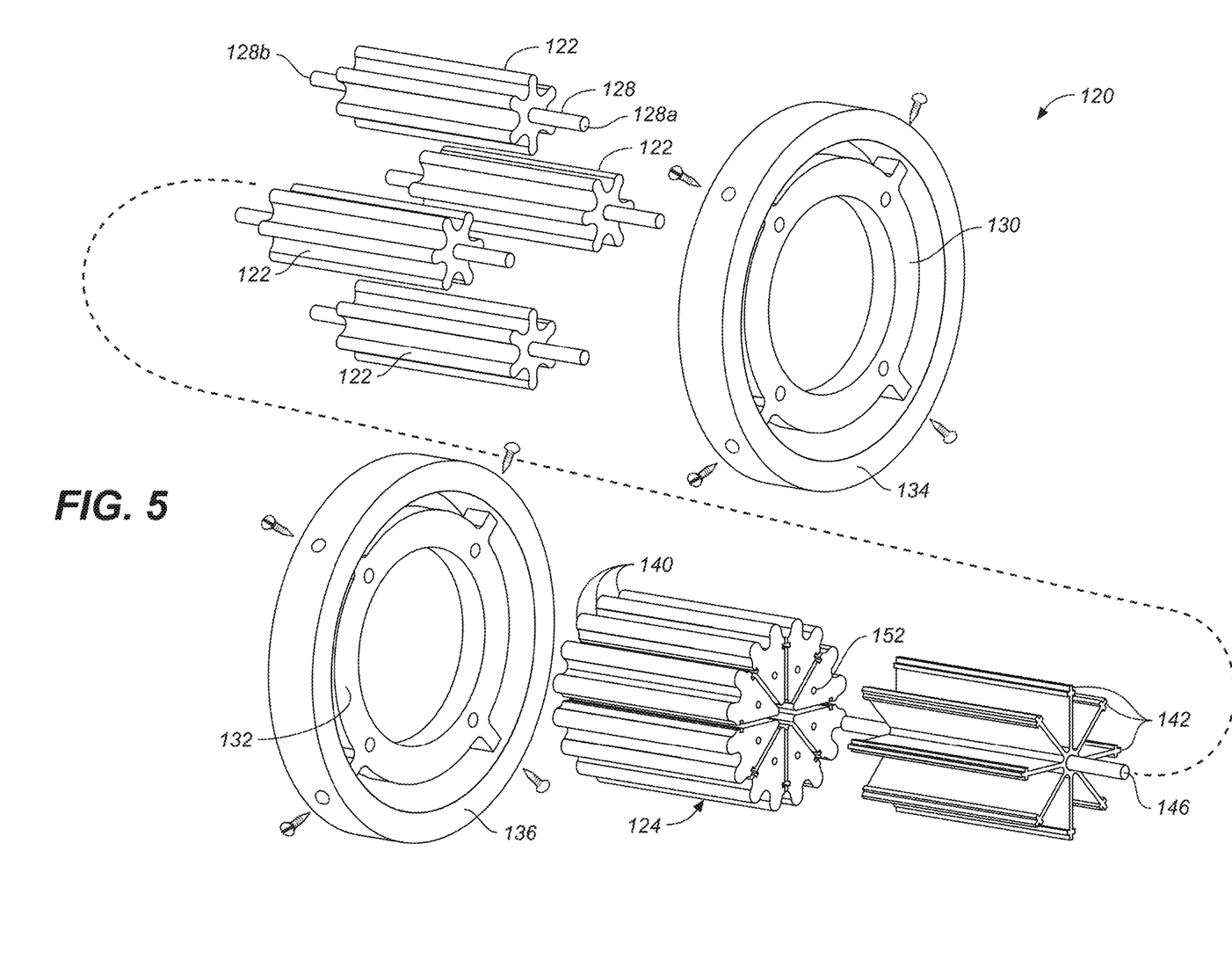
FIG. 5 is an exploded upper perspective view showing an embodiment of the present invention, showing rotating geared brushes which rotated in mesh with a complementary geared commutator.
Figure 6:
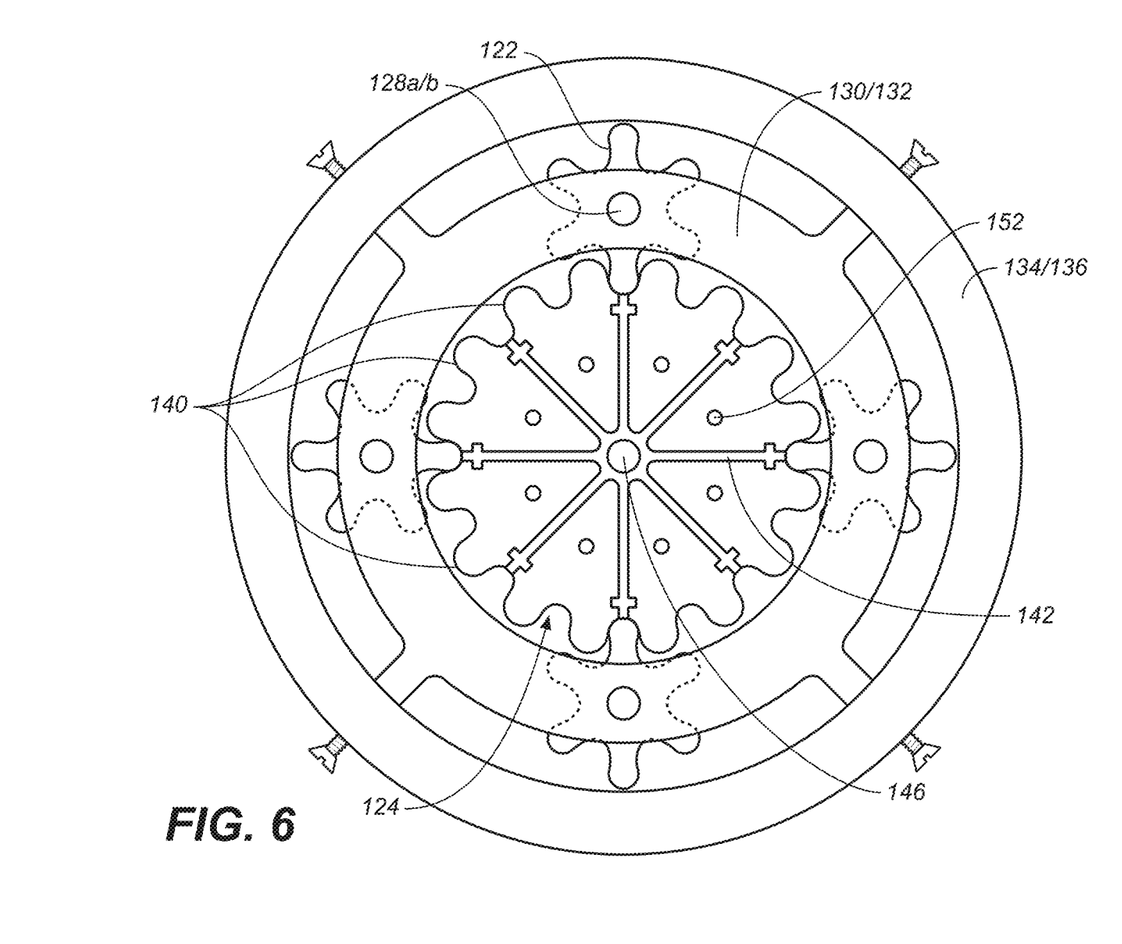
FIG. 6 is an exploded end view in elevation thereof.
Figure 7:
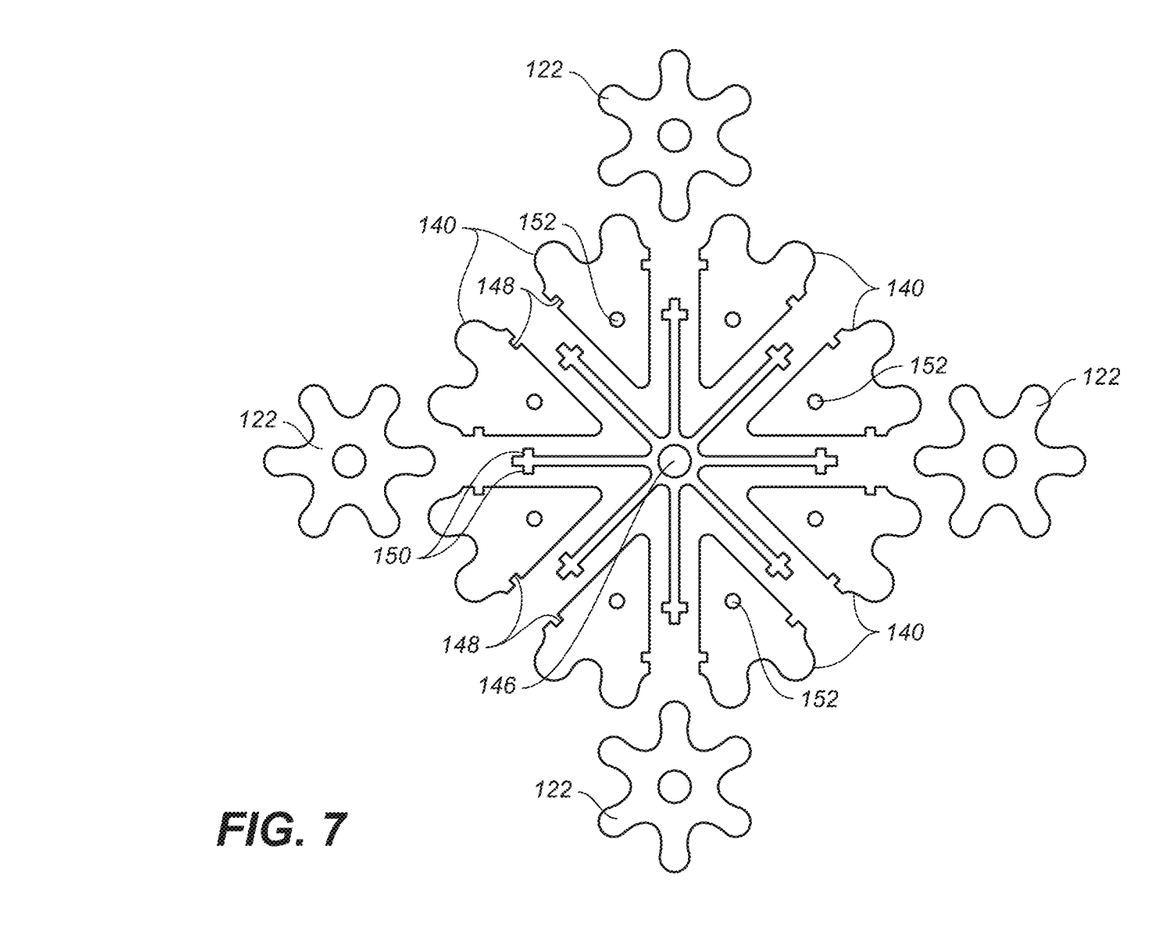
FIG. 7 is also an end view thereof, with the housing removed to better show the geared rotating brushes and commutator.
Figure 8:
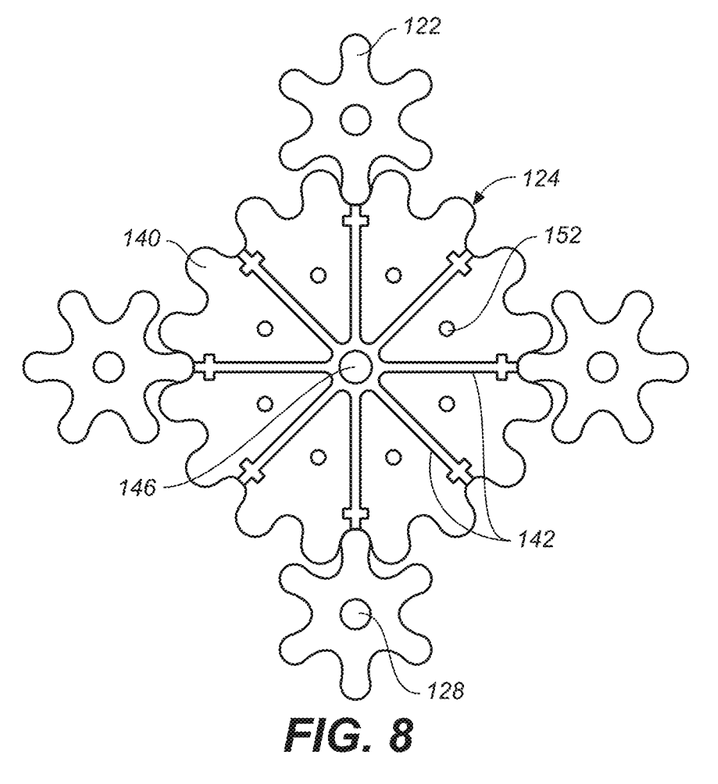
FIG. 8 is the same end view in elevation showing the gear teeth of the geared rotating brushes and geared commutator in mesh.

In this embodiment, the commutator 124 is divided into conductive geared segments 140 electrically isolated from one another with dielectric/non-conducting spokes 142. The spokes may be joined on a common dielectric central hub 144 disposed around the motor shaft 146, which is thus isolated from the commutator segments. Combined, the segments form a singular geared commutator. In an embodiment, the spokes may be configured in a kind of paddlewheel structure (see, esp. FIG. 5). As can be seen in the views, in this embodiment the conductive segments are wedge-shaped elements having a female channel or groove 148 which cooperate with a male flange or rib 150 that retain the segments on the spokes. The conductive segments may easily be slidingly inserted into the wedge-shaped spaces between spokes using the complementary male/female elements. Current provided to the commutator segments is transmitted to the rotor coils through leads connected to the segments at electrical connections 152.

As in the immediately preceding embodiment, this embodiment exploits the mechanical and electrical advantages of having four or more evenly spaced rotating brushes disposed around the commutator. However, advantageously, the brushes and commutator are here in constant mesh engagement, and therefore the effective areas of electrical contact are both larger and more abundant.

Figure 9:
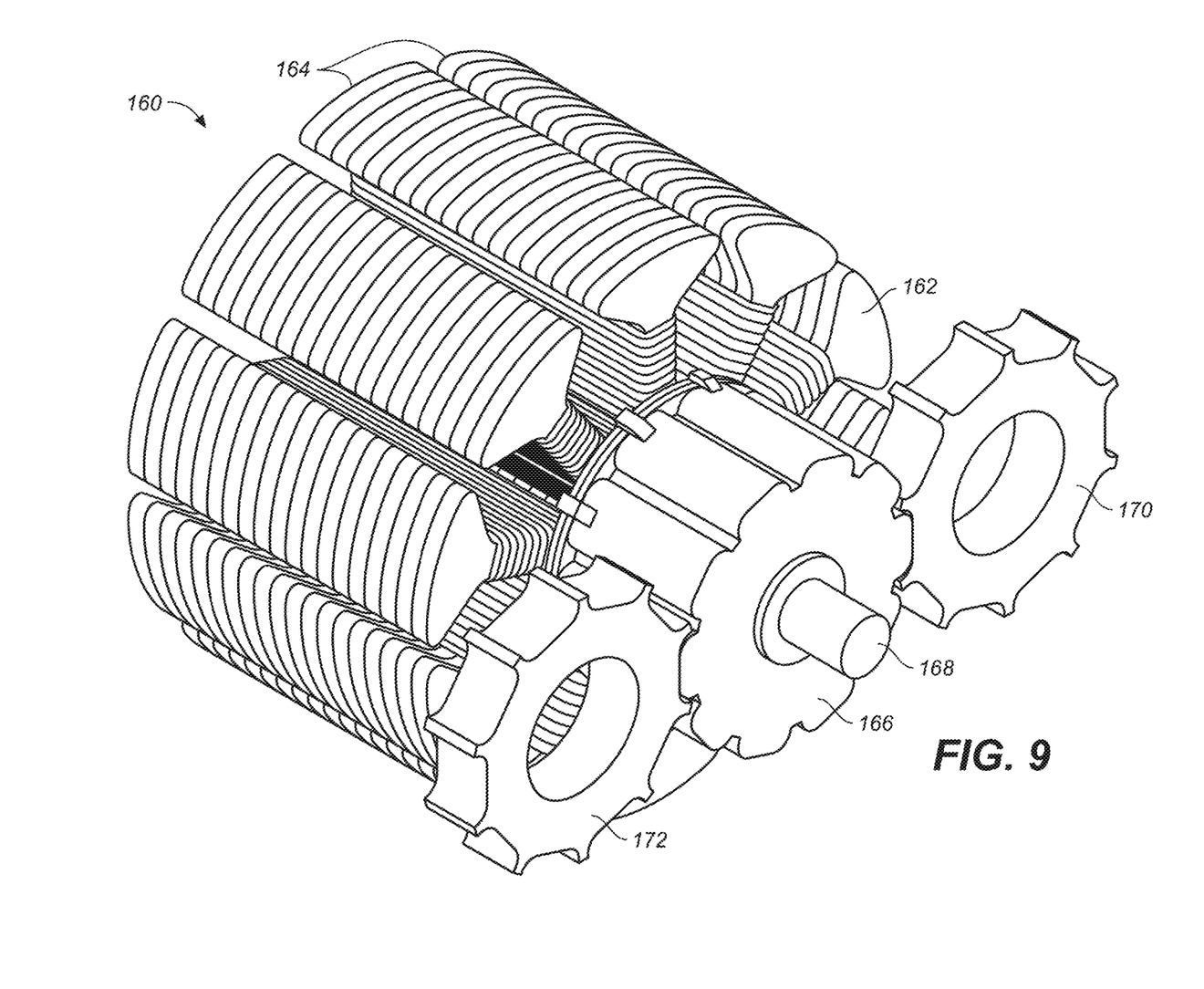
FIG. 9 is a perspective view of an embodiment of paired and opposing geared brushes engaged with a geared commutator.

This is perhaps exemplified in the most summary illustration of the drawing set, viz., FIG. 9, which again shows a motor assembly 160 including an armature 162 having armature windings 164, which are energized by power fed through a geared commutator 166, each axially disposed around a drive shaft 168. Current is provided to the commutator through opposing geared brushes 170, 172, disposed substantially 180 degrees apart around the commutator.

It will be appreciated that the features are fungible and thus the combinations of features are permutations that may comprise any of a number of suitable combinations.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which shall be defined by claims set out in a non-provisional patent application claiming the benefit of the priority date of the instant application.

What is claimed as invention is:

1. A rotating brush assembly for an electric motor, comprising:
   a commutator; and
   first and second brushes, each rotatingly mounted on an axle disposed between arms coupled to respective first and second brush holders;
   wherein said brush holders are urged toward said commutator with a spring; and
   further wherein said first and second brushes rotate in a direction opposite the direction in which said commutator rotates;
   wherein said first and second brushes are cylindrical and said commutator is cylindrical; and
   wherein said first and second brushes each include arcuate surface elements that engage complementary arcuate surface elements on said commutator so as to match rotation rates of said first and second brushes and to prevent slippage of said first and second brushes relative to said commutator during rotation.

2. The rotating brush assembly of claim 1, wherein said first and second brushes are mounted in opposing pairs substantially 180 degrees apart around said commutator.

3. The rotating brush assembly of claim 1, wherein said commutator is a segmented commutator.

4. The rotating brush assembly of claim 1, wherein said surface elements are O-rings.

5. The rotating brush assembly of claim 1, wherein said surface elements on each of said first and second brushes and said commutator are gear teeth in mesh.

6. The rotating brush assembly of claim 1, wherein said first and second brushes are mounted to a stator with a stationary mount.

7. The rotating brush assembly of claim 1, wherein said arms are mounted to said first and second brush holders so as to keep said first and second brushes in a spaced apart relationship to their respective brush holders.

8. The rotating brush assembly of claim 1, wherein said first and second brushes are mounted to a stator with a stationary mount.

9. The rotating brush assembly of claim 1, wherein the opposing rotation of said commutator and said first and second brushes is accomplished using only surface engagement of said first and second brushes and said commutator.

10. A rotating brush assembly for an electric motor, comprising:
  a commutator;
  a plurality of rotating brushes; and
  a segmented commutator in mechanical and electrical contact with said plurality of rotating brushes;
  wherein each of said rotating brushes is configured as an electrically energized cylindrical roller bearing and includes a conductive shaft rotatably journaled at a first and second end in a cup holder assembly that includes a bearing race, ball bearings, a conductive coupling bearing, and a hemispherical cap through which an electrical lead is disposed at or near an apex of the hemispherical cap; and wherein said lead electrically contacts with said coupling bearing, which in turn couples to an end of said conductive shaft of said cylindrical roller bearing, such that said plurality of rotating brushes is disposed around said commutator to center and support said commutator; and
  further wherein each of said plurality of brushes rotates in a direction opposite the direction in which said commutator rotates.

11. The rotating brush assembly of claim 10, wherein each of said cup holder assemblies is disposed in first and second dielectric cup holder housings.

12. The rotating brush assembly of claim 10, wherein each of said cup holder housings include a channel disposed on an inner side into which said cup holder assemblies are secured.

13. The rotating brush assembly of claim 10, wherein said plurality of brushes are disposed in opposing orientations, such that they provide opposing currents switched by said commutator in accordance with the number of poles in an operatively connected motor.

14. The rotating brush assembly of claim 10, wherein said rotating brushes are electrically isolated from one another and wired independently.

15. A rotating brush assembly for an electric motor, comprising:
  a commutator; and
  first and second brushes, each rotatingly mounted on an axle disposed between arms coupled to respective first and second brush holders;
  wherein said brush holders are urged toward said commutator with a spring; and
  further wherein said first and second brushes rotate in a direction opposite the direction in which said commutator rotates;
  wherein said first and second rotating brushes are geared with toothed surfaces, and wherein said commutator is geared with a toothed surface in mesh with said toothed surface of said first and second brushes, wherein the rotation of said first and second brushes in relation to said commutator involves directionally opposite rotation of gear teeth in mesh.

16. The rotating brush assembly of claim 15, wherein said commutator is divided into conductive geared segments electrically isolated from one another with dielectric spokes.

17. The rotating brush assembly of claim 16, wherein said dielectric spokes are joined on a common dielectric central hub disposed around a motor shaft, such that said conductive geared segments form a singular geared commutator.

* * * * *